(12) United States Patent
Matsumoto et al.

(10) Patent No.: US 11,230,087 B2
(45) Date of Patent: Jan. 25, 2022

(54) HEAT INSULATING SHEET, HEAT INSULATING MATERIAL, AND MANUFACTURING METHOD OF HEAT INSULATING SHEET

(71) Applicants: KANEKA CORPORATION, Osaka (JP); TOCHIGI KANEKA CORPORATION, Tochigi (JP)

(72) Inventors: Kazuaki Matsumoto, Tochigi (JP); Hiroyuki Kikuchi, Tochigi (JP); Shuzo Imai, Tochigi (JP)

(73) Assignees: KANEKA CORPORATION, Osaka (JP); TOCHIGI KANEKA CORPORATION, Tochigi (JP)

( * ) Notice: Subject to any disclaimer, the term of this patent is extended or adjusted under 35 U.S.C. 154(b) by 0 days.

(21) Appl. No.: 17/029,460

(22) Filed: Sep. 23, 2020

(65) Prior Publication Data
US 2021/0001605 A1    Jan. 7, 2021

Related U.S. Application Data

(63) Continuation of application No. PCT/JP2019/002146, filed on Jan. 23, 2019.

(30) Foreign Application Priority Data

Mar. 23, 2018   (JP) ................... 2018-056073

(51) Int. Cl.
*B32B 7/08*      (2019.01)
*B32B 15/08*     (2006.01)
(Continued)

(52) U.S. Cl.
CPC ............ *B32B 15/08* (2013.01); *B32B 5/022* (2013.01); *B32B 7/08* (2013.01); *B32B 15/09* (2013.01);
(Continued)

(58) Field of Classification Search
CPC .......... B32B 15/08; B32B 5/022; B32B 7/08; B32B 15/09; B32B 15/20; B32B 27/12;
(Continued)

(56) References Cited

U.S. PATENT DOCUMENTS

| | | | | |
|---|---|---|---|---|
| 5,939,178 A | * | 8/1999 | Boich | ..................... B32B 25/10 428/198 |
| 6,770,350 B2 | * | 8/2004 | Arndt | .................... F16L 59/026 428/131 |

(Continued)

FOREIGN PATENT DOCUMENTS

| | | |
|---|---|---|
| DE | 2252237 A1 | 5/1974 |
| JP | H09327887 A | 12/1997 |

(Continued)

OTHER PUBLICATIONS

International Search Report issued in corresponding International Application No. PCT/JP2019/002146; dated Apr. 16, 2019 (2 pages).

(Continued)

*Primary Examiner* — Travis M Figg
(74) *Attorney, Agent, or Firm* — Osha Bergman Watanabe & Burton

(57) ABSTRACT

Provided are heat insulating sheets that may include a resin film having a metal layer and a nonwoven fabric including resin fiber, wherein the resin film and the nonwoven fabric are joined by through holes penetrating the resin film and the nonwoven fabric, and wherein a ratio (La/Lb) of an average distance (La) between the through holes in the resin film to an average distance (Lb) between the through holes in the nonwoven fabric is 1.001 or more and 1.10 or less. Further provided are manufacturing methods of a heat insulating sheet that may include a resin film having a metal layer and a nonwoven fabric including a resin fiber.

10 Claims, 4 Drawing Sheets

(51) Int. Cl.
- *B32B 5/02* (2006.01)
- *B32B 15/09* (2006.01)
- *B32B 15/20* (2006.01)
- *B32B 27/12* (2006.01)
- *B32B 27/36* (2006.01)
- *F16L 59/02* (2006.01)
- *F16L 59/07* (2006.01)

(52) U.S. Cl.
CPC .............. *B32B 15/20* (2013.01); *B32B 27/12* (2013.01); *B32B 27/36* (2013.01); *F16L 59/02* (2013.01); *F16L 59/07* (2013.01); *B32B 2250/40* (2013.01); *B32B 2262/0276* (2013.01); *B32B 2307/304* (2013.01); *Y10T 428/24* (2015.01); *Y10T 428/2476* (2015.01)

(58) Field of Classification Search
CPC ................ B32B 27/36; B32B 2250/40; B32B 2262/0276; B32B 2307/304; F16L 59/02; F16L 59/07; Y10T 428/24; Y10T 428/2476
See application file for complete search history.

(56) References Cited

U.S. PATENT DOCUMENTS

| | | | | |
|---|---|---|---|---|
| 2004/0242097 | A1* | 12/2004 | Hasenoehrl | A61F 13/51113 442/59 |
| 2015/0118438 | A1* | 4/2015 | Yui | A43B 7/34 428/101 |
| 2015/0314552 | A1* | 11/2015 | Kuman | B32B 7/02 428/132 |
| 2018/0142387 | A1* | 5/2018 | Wang | B32B 5/245 |

FOREIGN PATENT DOCUMENTS

| | | |
|---|---|---|
| JP | 2015143574 A | 8/2015 |
| JP | 5878751 B2 | 3/2016 |

OTHER PUBLICATIONS

Written Opinion of the International Searching Authority issued in corresponding International Application No. PCT/JP2019/002416; dated Apr. 16, 2019 (5 pages).

T. Ohmori, "Evacuated Multilayer Insulation I-Performance Evaluation," vol. 51, No. 6, p. 248, 2016 (1 page).

* cited by examiner

| | | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | COM-PARATIVE EXAMPLE 1 | COM-PARATIVE EXAMPLE 2 |
|---|---|---|---|---|---|---|---|---|---|---|---|---|
| PROCESSING CONDITIONS OF HEAT INSULATING SHEET | TEMPERATURE OF HOT NEEDLE (°C) | °C | 290 | 290 | 290 | 290 | 290 | 330 | 290 | 290 | 290 | 330 |
| | TENSION TO NONWOVEN FABRIC (N) | N | 60 | 50 | 40 | 20 | 80 | 20 | 1 | 1 | 1 | 1 |
| | POST-TREATMENT PROCESS | | NONE | NONE | NONE | NONE | NONE | NONE | 180°C × 1 MINUTE | 80°C × 20 DAYS | NONE | NONE |
| HEAT INSULATING SHEET EVALUATION | RATIO OF AVERAGE DISTANCE BETWEEN THROUGH HOLES (LA/LB) | — | 1.0050 | 1.0037 | 1.0032 | 1.0010 | 1.0060 | 1.0020 | 1.0040 | 1.0040 | 1.0005 | 1.0008 |
| HEAT INSULATING MATERIAL EVALUATION (60 HEAT INSULATING SHEETS BEING STACKED) | THICKNESS (T0) | mm | 35 | 27 | 24 | 15 | 55 | 17 | 31 | 25 | 6.0 | 8.0 |
| | COMPRESSED THICKNESS | mm | 3.5 | 3.5 | 3.5 | 3.5 | 3.5 | 3.5 | 3.5 | 3.5 | 3.5 | 3.5 |
| | THICKNESS (T0) / COMPRESSED THICKNESS (T1) | — | 10.00 | 7.71 | 6.86 | 4.29 | 15.71 | 4.86 | 8.86 | 7.14 | 1.71 | 2.29 |
| | HEAT FLUX | W/m² | 0.35 | 0.40 | 0.40 | 0.47 | 0.33 | 0.49 | 0.37 | 0.40 | 0.65 | 0.62 |

FIG. 4

HEAT INSULATING SHEET, HEAT INSULATING MATERIAL, AND MANUFACTURING METHOD OF HEAT INSULATING SHEET

CROSS REFERENCE TO RELATED APPLICATION

The contents of the following Japanese patent application(s) are incorporated herein by reference:
No. 2018-056073 filed in JP on Mar. 23, 2018
No. PCT/JP2019/002146 filed on Jan. 23, 2019

TECHNICAL FIELD

One or more embodiments of the present disclosure relate to a heat insulating sheet, heat insulating material, and a manufacturing method of a heat insulating sheet.

BACKGROUND

A heat insulating material is known in which a metal layer-containing film having aluminum layers on both sides of a polyester resin sheet and a net woven with polyester fibers are alternately stacked. For example, Patent Document 1 discloses a stacked heat insulating material in which low emissivity layers and low heat conductive layers are alternately overlapped. Patent Document 2 discloses a heat insulating sheet in which a resin film having a metal layer and a nonwoven fabric containing resin fibers are stacked upon each other and then joined via a through hole. Non-Patent Document 1 discloses in detail the effect of a multilayer heat insulating material called MLI or super insulation on vacuum heat insulation.

PATENT DOCUMENTS

[Patent Document 1] JP-A-58-78751
[Patent Document 2] JP-A-2015-143574

NON PATENT DOCUMENTS

[Non-Patent Document 1] OMORI Takao, Multilayer Insulation Technology I. Tokyo: Low Temperature Engineering, 2016, Vol. 51, No. 6, p 248

SUMMARY

In a heat insulating material in which a plurality of heat insulating sheets made of a resin film having a metal layer and a nonwoven fabric were stacked, one or more embodiments of the present disclosure provide weight reduction and heat insulating properties.

A heat insulating sheet according to one or more embodiments of the present invention may include a resin film having a metal layer, and a nonwoven fabric including resin fiber, wherein the resin film and the nonwoven fabric may be joined by through holes penetrating the resin film and the nonwoven fabric. A ratio (La/Lb) of an average distance (La) between the through holes in the resin film to an average distance (Lb) between the through holes in the nonwoven fabric may be 1.0010 or more and 1.10 or less.

The resin film may include a resin layer. The resin film may include a metal layer disposed on one surface side of the resin layer.

The resin film may include another metal layer disposed on another surface side of the resin layer.

The nonwoven fabric may be disposed on one surface side of the resin film.

The resin film may include a polyester resin.

The metal layer may include at least one of aluminum, gold, silver, copper, platinum, tin, and nickel.

The metal layer may be aluminum.

A density of the nonwoven fabric may be 2 $g/m^2$ or more and 150 $g/m^2$ or less.

A plurality of the heat insulating sheet may be stacked upon each other.

A ratio of an initial thickness ($T_0$)/a compressed thickness ($T_1$) may be 2.5 or more when a thickness of 60 sheets of the heat insulating sheet stacked upon a flat surface is measured.

A manufacturing method of a heat insulating sheet may be a manufacturing method of a heat insulating sheet comprising a resin film having a metal layer and a nonwoven fabric including a resin fiber. The manufacturing method of the heat insulating sheet may include a penetrating step of providing a through hole penetrating the resin film and the nonwoven fabric by using a hot protrusion while pulling the nonwoven fabric in a state where the resin film and the nonwoven fabric are overlapped.

The manufacturing method of the heat insulating sheet may further comprise a nonwoven fabric shrinking step of shrinking the nonwoven fabric by heat treatment.

A ratio (La/Lb) of an average distance (La) between through holes in the resin film to an average distance (Lb) between through holes in the nonwoven fabric may be 1.0010 or more and 1.10 or less.

The metal layer may be aluminum.

A density of the nonwoven fabric may be 2 $g/m^2$ or more and 150 $g/m^2$ or less.

BRIEF DESCRIPTION OF THE DRAWINGS

FIG. 4 is a table showing an example of the results of measuring the heat insulating properties of the heat insulating sheet by changing at least one of the tension to the nonwoven fabric and the temperature of the hot needle.

DETAILED DESCRIPTION

Figure 1:
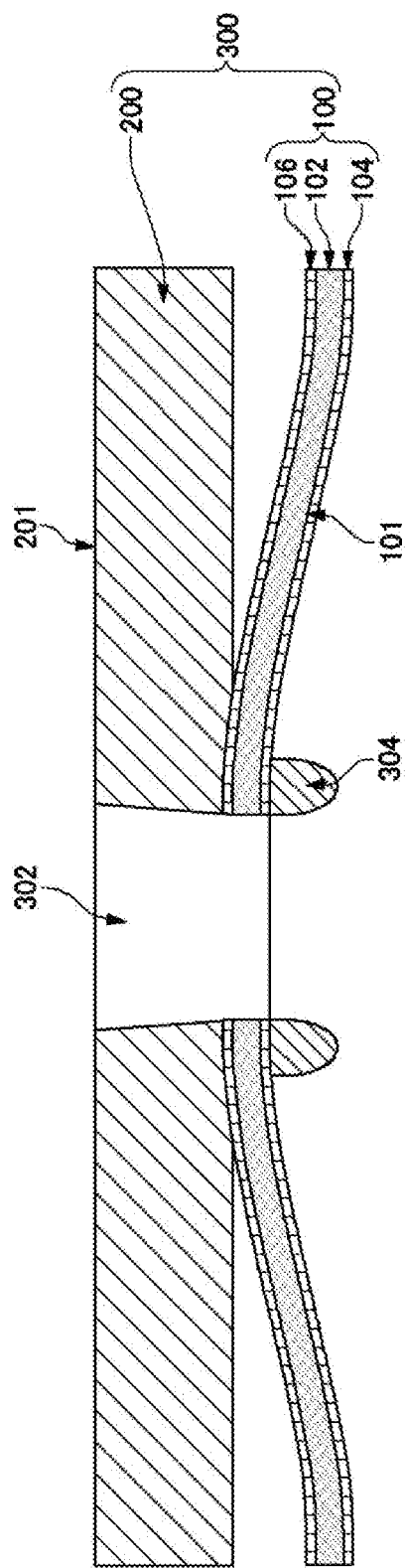
FIG. 1 is a cross-sectional view of a portion around a through hole of a heat insulating sheet.

Hereinafter, one or more embodiments of the present invention will be described.

As a result of intensive studies, the present inventors have provided an (A) resin film having a metal layer and a (B) nonwoven fabric including a resin fiber. It has been found that in a heat insulating sheet in which the (A) resin film having the metal layer and the (B) nonwoven fabric including the resin fiber are joined by through holes penetrating the (A) resin film having the metal layer and the (B) nonwoven fabric including the resin fiber, by making the (A) resin film having the metal layer have a small amount of slack and making the (B) nonwoven fabric including the resin fiber have a large amount of slack, the heat insulating sheet material can be significantly reduced in weight while heat conduction and radiant heat are significantly suppressed at the same time. The heat insulating sheet having such a configuration exhibits excellent heat insulating ability by being used, for example, in a vacuum environment or a low atmospheric pressure environment.

<Configuration of (A) Resin Film Having the Metal Layer>

In the (A) resin film having the metal layer, the metal layer may be formed on both surfaces of the resin film layer, or may be formed on only one surface of the resin film layer.

A resin film for forming the (A) resin film having the metal layer in one or more embodiments may be made of a thermoplastic resin. As the thermoplastic resin, for example, a polyester such as polyethylene terephthalate or polybutylene terephthalate, polyphenylene sulfide, a polyolefin such as polyethylene or polypropylene, or a polyamide such as polyamide 6 or polyamide 66 can be used.

From the viewpoint of melting point, water absorption, metal adhesion, tear strength, weight, cost, and the like, it is desirable to use polyester resin, polyphenylene sulfide resin, polypropylene resin, or the like.

<Metal Layer Included in (A) Resin Film Having the Metal Layer>

As the metal configuring the metal layer included in the (A) resin film having the metal layer, for example, aluminum, gold, silver, copper, platinum, tin, nickel, or the like can be used. From the viewpoint of vertical infrared reflectance, ease of providing a metal layer, uniformity of metal film, weight, cost, or the like, it is desirable to use aluminum as the metal.

The method of forming the metal layer on the (A) resin film is not particularly limited, but may be performed by a continuous or batch vacuum deposition machine by electrothermal heating, sputtering, ion plating, ion beam, or the like. The thickness of the metal layer is not particularly limited, but in one or more embodiments may be 10 nm or more and 250 nm or less. By setting the thickness of the metal layer to 10 nm or more, it is possible to further suppress the amount of infrared rays transmitted from the metal layer and further suppress deterioration of the heat insulating property. In addition, by setting the thickness of the metal layer to 250 nm or less, it is possible to further suppress an increase in thermal conductivity in the metal layer and further suppress occurrence of cracks due to bending or the like during construction.

The thickness of the (A) resin film having the metal layer in one or more embodiments may be 3 μm or more and 100 μm or less, and 5 μm or more and 60 μm or less. By setting the thickness of the (A) resin film having the metal layer to 3 μm or more, it is possible to further suppress the occurrence of wrinkles in the metal layer. By setting the thickness of the (A) resin film having the metal layer to 5 μm or more, it is possible to further suppress the occurrence of wrinkles in the metal layer. In addition, by setting the thickness of the (A) resin film having the metal layer to 100 μm or less, it is possible to further suppress an increase in weight, further suppress an increase in contact area with the nonwoven fabric, and further suppress deterioration of the heat insulating property. In addition, by setting the thickness of the (A) resin film having the metal layer to 60 μm or less, it is possible to even further suppress an increase in weight, further suppress an increase in contact area with the nonwoven fabric, and even further suppress deterioration of the heat insulating property.

It is noted that the thickness of the metal layer can be obtained by measuring the surface resistance value with a four point low resistance meter (Lorester EP manufactured by Dia Instruments Co., Ltd.) and the metal film thickness can be calculated by using the surface resistance value and the metal film specific resistance value. The thickness of the (A) resin film having the metal layer can be measured by the method described in JIS L 1913, section 6.1.

[(B) Nonwoven Fabric Including the Resin Fiber]

1<Structure of (B) Nonwoven Fabric>

The structure of a (B) nonwoven fabric including the resin fiber in one or more embodiments of the present invention is not particularly limited, but may have a structure in which resin fibers overlap each other in multiple layers.

2<Resin Fiber Included in (B) Nonwoven Fabric>

In addition, the resin fiber may be formed of a thermoplastic resin. As the thermoplastic resin, for example, a resin such as a polyester such as polyethylene terephthalate or polybutylene terephthalate, polyphenylene sulfide, a polyolefin such as polyethylene or polypropylene, or a polyamide such as polyamide 6 or polyamide 66 can be used. From the viewpoint of melting point, water absorption, elasticity, tear strength, weight, cost, or the like, it is desirable to use polyester resin, polyphenylene sulfide resin, polypropylene resin, or the like.

3<Density (Weight Per Unit Area) of the (B) Nonwoven Fabric>

The density (weight per unit area) of the (B) nonwoven fabric including the resin fiber in one or more embodiments may be 2 gram per meter squared (g/m$^2$) or more and 150 g/m$^2$ or less, 3 g/m$^2$ or more and 100 g/m$^2$ or less, and 3 g/m$^2$ or more and 70 g/m$^2$ or less.

In order to prevent heat conduction, it is desirable that the density is low, that is, that the weight per unit area is light. The density of the nonwoven fabric in one or more embodiments may be 2 g/m$^2$ or more, because it is more difficult for the (A) resin films having the metal layer that sandwich the (B) nonwoven fabric including the resin fiber therebetween to come in contact with each other.

The density of the nonwoven fabric in one or more embodiments may be 3 g/m$^2$ or more, because it is more difficult for the (A) resin film having the metal layer that sandwich the (B) nonwoven fabric including the resin fiber therebetween to come in contact with each other. The density of the nonwoven fabric in one or more embodiments may be 150 g/m$^2$ or less, because the heat insulating property is improved. It is noted that the density (weight per unit area) of the nonwoven fabric can be measured by the method described in JIS L 1913, section 6.2.

FIG. 1 shows an example of a partial cross-sectional view of a heat insulating sheet 300 according to one or more embodiments of the present disclosure. The heat insulating sheet 300 includes an (A) resin film 100 having a metal layer and a nonwoven fabric 200. The (A) resin film 100 having the metal layer includes a resin layer 102 and metal layers 104 and 106. The metal layer 104 is disposed on one surface side of the resin layer 102. The metal layer 106 is disposed on the another surface side of the resin layer 102. The resin layer 102 is sandwiched between the metal layer 104 and the metal layer 106. The nonwoven fabric 200 is disposed on the surface side opposite of the resin layer 102 side of the metal layer 106.

The heat insulating sheet 300 includes a through hole 302 penetrating the (A) resin film 100 having the metal layer and the nonwoven fabric 200. The through hole 302 is an example of an opening.

The heat insulating sheet 300 may include a protruding portion 304 formed along the outer periphery of the through hole 302. The protruding portion 304 may protrude from a surface 101 of the (A) resin film 100 having the metal layer that is opposite of the surface on which the nonwoven fabric 200 is stacked, and may protrude from a surface 201 of the nonwoven fabric 200 that is opposite of the surface on which the (A) resin film 100 having the metal layer is stacked.

The heat insulating sheet 300 has a plurality of through holes 302. A heat insulating material can be formed by stacking a plurality of heat insulating sheets 300. The heat insulating material can be formed by overlapping, for example, 1 to 1000 sheets, 2 to 100 sheets, or 3 to 75 sheets of the heat insulating sheet 300.

Here, the through holes 302 may be formed by inserting a hot needle from the surface of the nonwoven fabric 200 that is opposite of the surface on which the (A) resin film 100 having the metal layer is stacked in a state where the (A) resin film 100 having the metal layer and the nonwoven fabric 200 overlap each other, and then withdrawing the hot needle. The through holes 302 may be formed by inserting a hot needle from the surface of the (A) resin film 100 having the metal layer that is opposite of the surface on which the nonwoven fabric 200 is stacked in a state where the (A) resin film 100 having the metal layer and the nonwoven fabric 200 overlap each other, and then withdrawing the hot needle. It is noted that the through holes 302 may be formed by a method other than the hot needle puncturing.

The through holes 302 are formed by hot needle puncturing in a state where the (A) resin film 100 having the metal layer and the nonwoven fabric 200 overlap each other. Then, the (A) resin film 100 having the metal layer and the nonwoven fabric 200 are welded together by melting a part of the resin forming the (A) resin film 100 having the metal layer and the nonwoven fabric 200 with the hot needle. Through the above steps, the (A) resin film 100 having the metal layer and the nonwoven fabric 200 are connected by the through holes 302. Furthermore, the protruding portion 304 may be formed on a peripheral portion of the through hole 302 due to solidification of a part of the resin forming the (A) resin film 100 having the metal layer and the nonwoven fabric 200 that has been melted by a hot needle.

[Ratio (La/Lb) of average distance (La) between through holes in the (A) resin film having the metal layer to average distance (Lb) between through holes in the (B) nonwoven fabric including the resin fiber. The heat insulating sheet according to one or more embodiments of the present disclosure is a heat insulating sheet in which the (B) nonwoven fabric and the (A) resin film having the metal layer are connected by through holes. When the distance between adjacent through holes when the material is spread on a flat surface are measured, at 10 arbitrarily selected points between the through holes, for each of the (B) nonwoven fabric and the (A) resin film having the metal layer, and an average distance (La) between the through holes in the (A) resin film having the metal layer and an average distance (Lb) between the through holes in the (B) nonwoven fabric are calculated, a ratio (La/Lb) of the average distance (La) between the through holes in the (A) resin film having the metal layer to the average distance (Lb) between the through holes in the (B) nonwoven fabric is 1.001 or more and 1.10 or less.

When the ratio (La/Lb) of the average distance (La) between the through holes in the (A) resin film having the metal layer to the average distance (Lb) between the through holes in the (B) nonwoven fabric is 1.001 or more and 1.10 or less, the (B) nonwoven fabric is in a taut state between the through holes, whereas the (A) resin film having the metal layer is in a loose state between the through holes. As a result, in the heat insulating sheet, since wrinkles are made in only the (A) resin film having the metal layer, the (A) resin film having the metal layer and the (B) nonwoven fabric come in contact only at points, and since heat conduction between the (A) resin film having the metal layer and the (B) nonwoven fabric can be hindered, it is possible to significantly improve the heat insulating ability in a vacuum state.

According to the heat insulating sheet of one or more embodiments of the present disclosure, the heat insulating sheet and the heat insulating material as a whole can be significantly reduced in weight while significantly suppressing heat conduction and radiant heat at the same time. Furthermore, the handleability of when the heat insulating material is applied on site and the time efficiency required for vacuum decompression and the like can be significantly improved. In addition, in a large vacuum heat insulating container that requires particularly excellent heat insulating performance, high heat insulation, and efficiency in design and construction can be achieved.

Since the average distance (La) between the through holes in the (A) resin film having the metal layer/the average distance (Lb) between the through holes in the (B) nonwoven fabric is difficult to measure in a state where both are connected by the through holes, it can be measured by a method of stretching the wrinkles in the (A) resin film having the metal layer and the (B) nonwoven fabric after once removing the connections in the through holes, and then measuring the distance between the through holes in both at 10 points or more among the same through holes, and calculating the average value.

The average distance (La) between the through holes in the (A) resin film having the metal layer/the average distance (Lb) between the through holes in the (B) nonwoven fabric is required to be 1.001 or more and 1.10 or less. When the ratio (La/Lb) is less than 1.001, the effect of suppressing heat conduction is not excellent. The ratio (La/Lb) in one or more embodiments may be 1.0015 or more, 1.002 or more, and 1.0025 or more. On the other hand, the ratio (La/Lb) in one or more embodiments may be 1.10 or less, since the heat insulating material at these ratios is excellent in handleability or storability in a small space. The ratio (La/Lb) in one or more embodiments may be 1.05 or less, 1.02 or less, and 1.01 or less.

In addition, when the ratio (La/Lb) is 1.001 or more, when multiple heat insulating sheets are stacked and placed upon a flat surface as heat insulating material, wrinkles in the (A) resin film having the metal layer cause the thickness to increase at the time of stacking. However, since the thickness at the time of stacking increases due to the wrinkles in the (A) resin film having the metal layer, when pressure is applied to the heat insulating material on the flat surface, the wrinkles are crushed and the thickness of the whole heat insulating material decreases.

In the heat insulating material formed by stacking the plurality of heat insulating sheets, the ratio of (thickness when compressed only by its own weight)/(thickness when compressed at a pressure of 1 kPa) in one or more embodiments may be 2.5 or more when measuring the thickness, in a case where 60 sheets of the heat insulating sheet are stacked on a flat surface. The ratio becomes 2.5 or more due to large wrinkles being formed in each heat insulating sheet of each layer. The ratio of (thickness when compressed only by its own weight)/(thickness when compressed at a pressure of 1 kPa) in one or more embodiments may be 3.0 or more, and 4.0 or more. On the other hand, the ratio of (thickness when compressed only by its own weight)/(thickness when compressed at a pressure of 1 kPa) in one or more embodiments may be 50.0 or less, since the heat insulating material is excellent in handleability and storability in a small space. The ratio of the thicknesses in one or more embodiments may be 40.0 or less, 30.0 or less, and 25.0 or less.

[Manufacturing Method of Heat Insulating Sheet]

A manufacturing method of the heat insulating sheet according to one or more embodiments of the present invention includes a step of connecting the (B) nonwoven fabric formed by a nonwoven fabric including a resin fiber and the (A) resin film having the metal layer by melting the resin included in the (B) nonwoven fabric and the resin film constituting the (A) resin film having the metal layer through through holes.

Here, the through holes may be formed by inserting a hot needle heated to a temperature exceeding the melting points of both the (A) resin film having the metal layer and the (B) nonwoven fabric from the surface opposite of the surface of the (B) nonwoven fabric on which the (A) resin film having the metal layer is stacked in a state where the (A) resin film having the metal layer and the (B) nonwoven fabric overlap each other, and then withdrawing the hot needle. The through holes may be formed by inserting a hot needle from the surface opposite of the surface of the (A) resin film having the metal layer on which the (B) nonwoven fabric is stacked in a state where the (A) resin film having the metal layer and the (B) nonwoven fabric overlap each other, and then withdrawing the hot needle. It is noted that the through holes may be formed by a method other than the hot needle puncturing.

Various methods can be given as examples of a manufacturing method in which the (average distance between the through holes in the (A) resin film having the metal layer/average distance between the through holes in the (B) nonwoven fabric) is 1.001 or more and 1.10 or less. For example, a method using a phenomenon in which the heat shrinkage rate of the (B) nonwoven fabric including the resin fiber is greater than that of the (A) resin film having the metal layer including the resin film can be given as an example. According to this method, it is possible to make the (average distance between the through holes in the (A) resin film having the metal layer/average distance between the through holes in the (B) nonwoven fabric) 1.001 or more and 1.10 or less by simply heat-treating the heat insulating sheet under specific conditions.

As an example of a method of heat-treating the heat insulating sheet, there is a method of, in the step of melting the (B) nonwoven fabric including the resin fiber and the (A) resin film having the metal layer to be connected each other, causing a heat-shrinking of the (B) nonwoven fabric including the resin fiber by heating them for a short time, thereby making the ratio of the distances between the through holes in each within one or more embodiments of a provided range.

In addition, as an example of another method of heat-treating the heat insulating sheet, there is a method of, in a state where the heat insulating sheet is connected by the through holes, causing a heat-shrinking of the (B) nonwoven fabric including the resin fiber by heating the heat insulating sheet at a temperature that is greater than or equal to the temperature at which the nonwoven fabric including the resin fiber causes heat-shrinking, thereby making the ratio of the distances between the through holes in each of the (B) nonwoven fabric including the resin fiber and the (A) resin film having the metal layer within one or more embodiments of a provided range.

As an example of another manufacturing method in which the (average distance between the through holes in the (A) resin film having the metal layer/average distance between the through holes in the (B) nonwoven fabric) is 1.001 or more and 1.10 or less, for example, there is a method of, in the step of melting the (B) nonwoven fabric including the resin fiber and the (A) resin film having the metal layer to be connected to each other, connecting them while applying higher tension to the (B) nonwoven fabric including the resin fiber than the (A) resin film having the metal layer. According to this method, the (average distance between the through holes in the (A) resin film having the metal layer/average distance between the through holes in the (B) nonwoven fabric) can be set to 1.001 or more and 1.10 or less without further treatment after the heat insulating sheet is manufactured.

[Heat Insulating Material]

Figure 2:
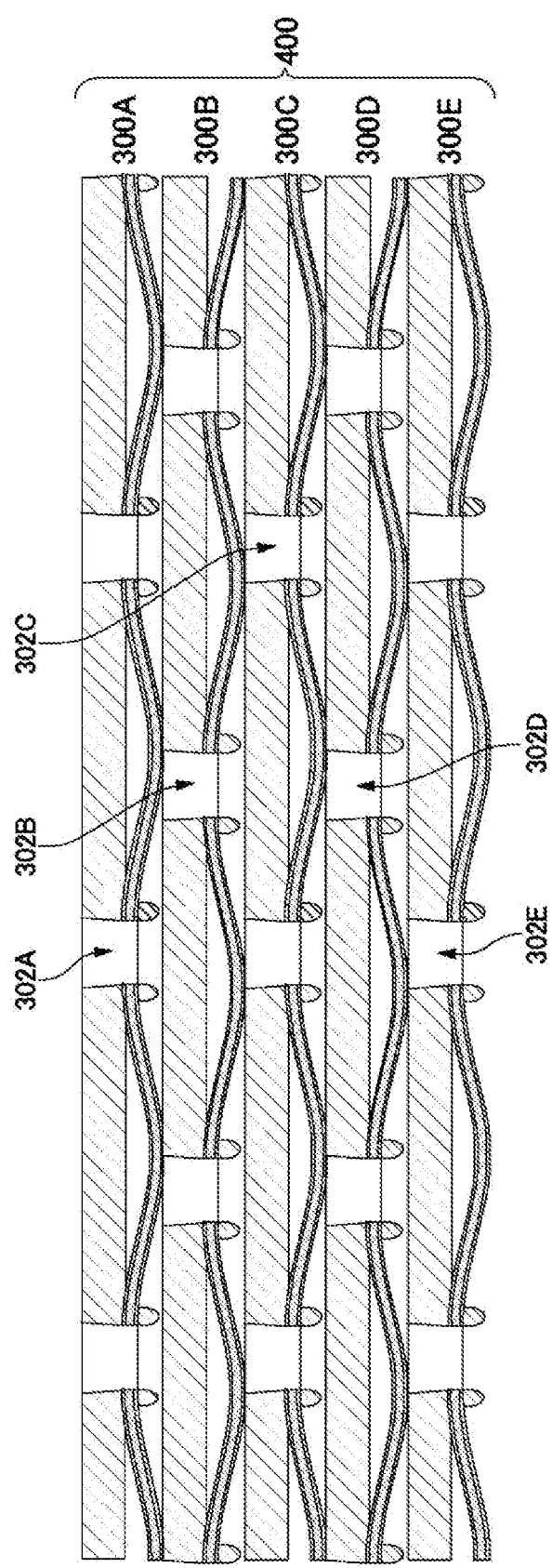
FIG. 2 is a partial cross-sectional view of a heat insulating material.

FIG. 2 is an example of a partial cross-sectional view of a heat insulating material 400 in which a plurality of the heat insulating sheet 300 are stacked according to one or more embodiments of the present disclosure. The heat insulating material 400 is configured by stacking heat insulating sheets 300A, 300B, 300C, 300D, and 300E. Here, the heat insulating sheets 300A, 300B, 300C, 300D, and 300E have through holes 302A, 302B, 302C, 302D, and 302E. The through holes 302A, 302B, 302C, 302D, and 302E function as passages for discharging, to the outside, air remaining between the heat insulating sheets 300A, 300B, 300C, 300D, and 300E when the heat insulating sheets 300A, 300B, 300C, 300D, and 300E overlap each other. As a result, the gaps between the heat insulating sheets 300A, 300B, 300C, 300D, and 300E can be made into a vacuum state, and the heat insulating property of the heat insulating material 400 can be improved.

The heat insulating sheets 300A, 300B, 300C, 300D, and 300E may have a plurality of through holes formed by a method such as a hot needle. However, it is desirable that at least some of the through holes formed in each of the heat insulating sheets 300A, 300B, 300C, 300D, and 300E are not formed so as to match their positions. As a result, it is possible to prevent at least some of the through holes from becoming overlapped in the stacking direction, and to further prevent infrared rays from passing through the through holes. It is noted that the through holes may be formed by a method other than the hot needle, such as thermal spraying or laser processing.

For example, the through holes 302A, 302B, 302C, 302D, and 302E formed in the heat insulating sheets 300A, 300B, 300C, 300D, and 300E may be respectively provided at positions that do not overlap in the stacking direction. As a result, even if a plurality of through holes is formed in each of the heat insulating sheets 300A, 300B, 300C, 300D, and 300E, it is possible to prevent infrared rays from passing through the through holes 302A, 302B, 302C, 302D, and 302E. Therefore, the heat insulating property of the heat insulating material 400 is hardly deteriorated by the plurality of through holes formed in each of the heat insulating sheets 300A, 300B, 300C, 300D, and 300E.

At least some of the through holes formed in the heat insulating sheet may be formed at a position that does not overlap with at least some of the through holes formed in another adjacent heat insulating sheet. That is, if the deterioration of the heat insulating property of the heat insulating material is suppressed, some of the through holes formed in the heat insulating sheet may be formed at positions overlapping with some of the through holes formed in another adjacent heat insulating sheet. It is noted that the non-overlapping position may be a position where at least 70% or more of all of the through holes formed in the heat insulating sheet do not overlap with through holes formed in another adjacent heat insulating sheet.

Figure 3:
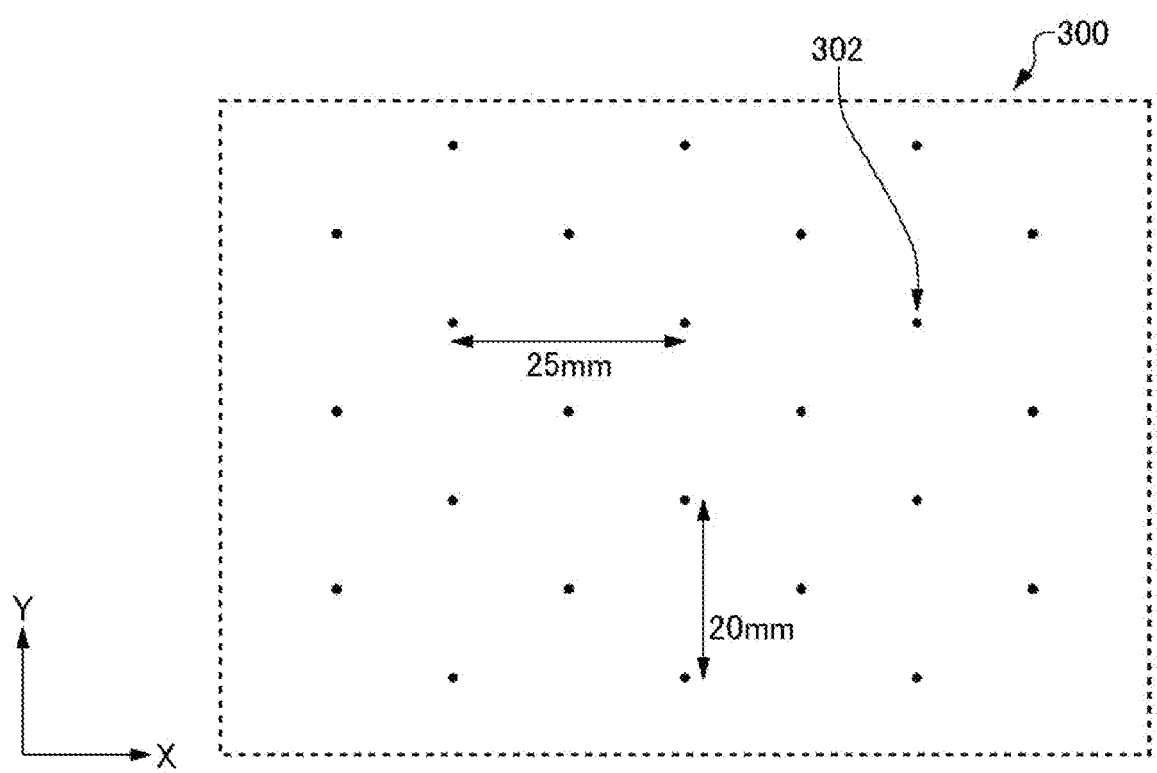
FIG. 3 is an enlarged view of the heat insulating sheet as viewed from above.

FIG. 3 is an enlarged view of the heat insulating sheet 300 as viewed from above. The plurality of through holes 302 formed in the heat insulating sheet 300 may be arranged in a staggered pattern. A distance between the through holes 302 in a first direction (X direction) and a distance between the through holes 302 in a second direction (Y direction) that is perpendicular to the first direction may be different. For example, the distance between the through holes 302 in the first direction (X direction) may be 25 mm. The distance between the through holes 302 in the second direction (Y direction) may be 20 mm.

While pulling the nonwoven fabric 200 in a state where the resin film 100 and the nonwoven fabric 200 are overlapped, the heat insulating sheet 300 may be manufactured by, forming the plurality of through holes 302 by inserting a hot protrusion such as a hot needle from the surface opposite to the surface of the resin film 100 on which the nonwoven fabric 200 is disposed, or from the surface opposite to the surface of the nonwoven fabric 200 on which the resin film 100 is disposed, and then withdrawing the hot protrusion. By forming the plurality of the through holes 302, the resin film 100 and the nonwoven fabric 200 are joined by the plurality of through holes 302. The resin film 100 and the nonwoven fabric 200 are joined by a part of the resin contained in the resin film 100 and the nonwoven fabric 200 that is melted by the hot protrusion.

EXAMPLES

Example 1

The following is an example of one or more embodiments of the present invention. It is noted that the materials used to make the heat insulating sheet are as follows.

(A) Resin Film Having the Metal Layer (A1) KF-9B manufactured by Kaneka Corporation that is a 9 μm thick polyester resin film having aluminum layers on both sides and having a surface resistance value of 0.6Ω/□ (Ω/sq).

(B) Nonwoven Fabric Including the Resin Fiber (B1) 05TH-5 manufactured by Hirose Paper Co., Ltd. that is a wet nonwoven fabric made of polyester with a weight per unit area of 5 g/square meter Example 1

While the (A1) resin film 100 and the (B1) nonwoven fabric 200 were conveyed in an overlapped state at a linear velocity of about 20 m/min, the (B1) nonwoven fabric was subjected to a tension of 60 N, and the processing temperature was 290° C. A hot needle was pierced every 20 mm to produce the heat insulating sheet 300 having the plurality of through holes 302.

Example 2

While the (A1) resin film 100 and the (B1) nonwoven fabric 200 were conveyed in an overlapped state at a linear velocity of about 20 m/min, the (B1) nonwoven fabric was subjected to a tension of 50 N, and the processing temperature was 290° C. A hot needle was pierced every 20 mm to produce the heat insulating sheet 300 having the plurality of through holes 302.

Example 3

While the (A1) resin film 100 and the (B1) nonwoven fabric 200 were conveyed in an overlapped state at a linear velocity of about 20 m/min, the (B1) nonwoven fabric was subjected to a tension of 40 N, and the processing temperature was 290° C. A hot needle was pierced every 20 mm to produce the heat insulating sheet 300 having the plurality of through holes 302.

Example 4

While the (A1) resin film 100 and the (B1) nonwoven fabric 200 were conveyed in an overlapped state at a linear velocity of about 20 m/min, the (B1) nonwoven fabric was subjected to a tension of 20 N, and the processing temperature was 290° C. A hot needle was pierced every 20 mm to produce the heat insulating sheet 300 having the plurality of through holes 302.

Example 5

While the (A1) resin film 100 and the (B1) nonwoven fabric 200 were conveyed in an overlapped state at a linear velocity of about 20 m/min, the (B1) nonwoven fabric was subjected to a tension of 80 N, and the processing temperature was 290° C. A hot needle was pierced every 20 mm to produce the heat insulating sheet 300 having the plurality of through holes 302.

Example 6

While the (A1) resin film 100 and the (B1) nonwoven fabric 200 were conveyed in an overlapped state at a linear velocity of about 20 m/min, the (B1) nonwoven fabric was subjected to a tension of 20 N, and the processing temperature was 330° C. A hot needle was pierced every 20 mm to produce the heat insulating sheet 300 having the plurality of through holes 302.

Example 7

While the (A1) resin film 100 and the (B1) nonwoven fabric 200 were conveyed in an overlapped state at a linear velocity of about 20 m/min, the (B1) nonwoven fabric was subjected to a tension of 1 N, and the processing temperature was 290° C. A hot needle was pierced every 20 mm to produce the heat insulating sheet 300 having the plurality of through holes 302. Furthermore, as a post-treatment process of the heat insulating sheet 300, the nonwoven fabric was heat-shrunk by a method in which the heat insulating sheet 300 was continuously wound for 1 minute while being in contact with a heating roll whose temperature was controlled to 180° C.

Example 8

While the (A1) resin film 100 and the (B1) nonwoven fabric 200 were conveyed in an overlapped state at a linear velocity of about 20 m/min, the (B1) nonwoven fabric was subjected to a tension of 1 N, and the processing temperature was 290° C. A hot needle was pierced every 20 mm to produce the heat insulating sheet 300 having the plurality of through holes 302. Furthermore, as a post-treatment process of the heat insulating sheet 300, after inserting a heat insulating material composed of 60 layers of the heat insulating sheet 300 into a hermetically sealed container, the pressure was reduced, and while the pressure was continuously reduced to maintain a high vacuum state of $10^{-5}$ Pa or less, the entire vacuum container was heated to 80° C. and held for 20 days to heat-shrink the nonwoven fabric.

Comparative Example 1

While the (A1) resin film 100 and the (B1) nonwoven fabric 200 were conveyed in an overlapped state at a linear velocity of about 20 m/min, the (B1) nonwoven fabric was subjected to a tension of 1 N, and the processing temperature was 290° C. A hot needle was pierced every 20 mm to produce the heat insulating sheet 300 having the plurality of through holes 302.

Comparative Example 2

While the (A1) resin film 100 and the (B1) nonwoven fabric 200 were conveyed in an overlapped state at a linear velocity of about 20 m/min, the (B1) nonwoven fabric was subjected to a tension of 1 N, and the processing temperature was 330° C. A hot needle was pierced every 20 mm to produce the heat insulating sheet 300 having the plurality of through holes 302.

<Heat Insulating Material Manufacturing Example>

First, the obtained heat insulating sheet 300 was cut to a width of 1000 mm and a length of 800 mm. 20 sheets of the cut heat insulating sheets 300 (rectangular shape having a width of 1000 mm and a length of 800 mm) were stacked, and 20 sheets of one side having a width of 1000 mm were sewn, and then wound around a winding rod having a diameter of 200 mm. Furthermore, a heat insulating material composed of a 20-layer heat insulating sheet produced in the same manner was wound twice to prepare a heat insulating material composed of a 60-layer heat insulating sheet 300.

<Method of Measuring Initial Thickness ($T_0$) of Heat Insulating Material>

A resulting heat insulating sheet 300 has 60 sheets of the obtained heat insulating sheet 300 having a width of 1000 mm and a length of 800 mm being stacked, the thickness was measured at 10 points with a steel scale without sewing, and the average value was set as the initial thickness ($T_0$) of the heat insulating material.

<Method for Measuring Compressed Thickness ($T_1$) of Heat Insulating Material>

The resulting heat insulating sheet 300 has 60 sheets of the obtained heat insulating sheet 300 having a width of 1000 mm and a length of 800 mm being stacked, the thickness when compressed to a pressure of 1 kPa was measured at 10 points with a steel scale without sewing, and the average value was set as the thickness ($T_1$) of the heat insulating material.

<(A) Average Distance (La) Between Through Holes in Resin Film Having Metal Layer)>

The average distance (La) between the through holes in the (A) resin film having the metal layer was measured by separating the heat insulating sheet provided with through holes into the (A) resin film having the metal layer and the (B) nonwoven fabric, measuring the distance at 50 points between adjacent through holes among the through holes in the (A) resin film having the metal layer, and measuring the average value thereof.

<Average Distance (Lb) Between the Through Holes in the (B) Nonwoven Fabric>

The average distance (Lb) between the through holes in the (B) nonwoven fabric was measured by separating the heat insulating sheet provided with through holes into the (A) resin film having the metal layer and the (B) nonwoven fabric, measuring the distance at 50 points between adjacent through holes among the through holes in the (B) nonwoven fabric, and measuring the average value thereof.

<Heat Flux Measurement Method>

The obtained 60-layer heat insulating material was inserted into a boil-off type calorimeter tester manufactured by Jeck Tori Co., Ltd., and the evaporation amount of liquid nitrogen in the calorimeter was measured by a mass flow meter. Assuming that the amount of heat required for evaporation of liquid nitrogen is the amount of heat that penetrated through the heat insulating material, the amount of heat that penetrated per unit area ($W/m^2$) of the heat insulating material was measured, and the measurement result was used as the heat insulating property of the heat insulating material. The measurement was performed under the following conditions.

(1) Temperature condition: 77K (low temperature side)/300K (high temperature side)

(2) Degree of vacuum: $1 \times 10^{-4}$ pascal (Pa) to $1 \times 10^{-5}$ Pa (3) Measurement time: 24 hours (h) after the intermediate layer temperature of the heat insulating material reaches the saturated ($\Delta$ 1° C./1 h) state and the average amount of evaporated nitrogen gas per hour reaches the saturated ($\Delta$10 cc/1 h) state (4) Measurement interval: 20 seconds (sec)

(5) Equipment used to measure the flow rate of nitrogen gas: Horiba Espec mass flow meter SEF-405 (standard flow range 100 standard cubic centimeter per minute (SCCM), flow accuracy±1%)

(6) Equipment used for temperature measurement of nitrogen gas: Chino JIS1 class sheath type K thermocouple (7) Data logger: KEYENCE NR-1000

FIG. 4 is a table showing an example of the result of measuring the heat insulating property of the heat insulating sheet by changing at least one of the tension to the nonwoven fabric and the temperature of the hot needle. It is noted that the heat insulating property in the table shown in FIG. 4 indicates an average value of the amount of intruding heat measured for the heat insulating material composed of the 60-layer heat insulating sheet.

The heat flux value is large in the comparative example, and it can be seen that the heat insulating performance is inferior in comparison with the example.

Comparative Example 3

An attempt was made to produce a heat insulating sheet having the ratio (La/Lb) of the average distance (La) between the through holes in the resin film to the average distance (Lb) between the through holes in the nonwoven fabric of 1.12 by, in a state where the (A1) resin film 100 and the (B1) nonwoven fabric 200 were overlapped, variously changing at least one of the linear velocity to be conveyed and the tension of the (B1) nonwoven fabric. However, since it was difficult to wind and handle the film, it was not possible to find manufacturing conditions for obtaining a good heat insulating sheet.

By using the heat insulating sheet and the heat insulating material of one or more embodiments of the present invention, it is possible to suppress the heat conduction to a very low value while reflecting radiant heat under a vacuum environment and a high decompression environment, and obtain a very excellent vacuum heat insulating property. Therefore, since it exhibits excellent heat insulating performance, it is very useful industrially as a vacuum insulating container for storing and transporting cryogenic substances, a vacuum insulating container for maintaining a low temperature environment in the superconducting field and for storing and transporting high temperature substances, and as a heat insulating material in low atmospheric pressure conditions such as space satellites and rocket fields.

DRAWING REFERENCE CHARACTERS 100 resin film having a metal layer
101 a surface of the resin film
102 resin layer
104 metal layer
106 metal layer
200 nonwoven fabric
201 a surface of the nonwoven fabric
300 heat insulating sheet (300A-300E)
302 through hole (302A-302E)
304 protruding portion
400 heat insulating material Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A heat insulating sheet, comprising:
    a resin film having a metal layer; and
    a nonwoven fabric including resin fiber,
    wherein the resin film and the nonwoven fabric are joined by through holes penetrating the resin film and the nonwoven fabric,
    wherein a ratio (La/Lb) of an average distance (La) between the through holes in the resin film to an average distance (Lb) between the through holes in the nonwoven fabric is 1.0010 or more and 1.10 or less,
    wherein the nonwoven fabric is in a taut state between the through holes, and
    wherein the resin film having the metal layer is in a loose state between the through holes, such that the resin film is wrinkled.

2. The heat insulating sheet according to claim 1, wherein the resin film includes a resin layer and the metal layer that is disposed on one surface side of the resin layer.

3. The heat insulating sheet according to claim 2, wherein the resin film further includes another metal layer disposed on another surface side of the resin layer.

4. The heat insulating sheet according to claim 1, wherein the nonwoven fabric is disposed on one surface side of the resin film.

5. The heat insulating sheet according to claim 1, wherein the resin film includes a polyester resin.

6. The heat insulating sheet according to claim 1, wherein the metal layer includes at least one of aluminum, gold, silver, copper, platinum, tin, and nickel.

7. The heat insulating sheet according to claim 1, wherein the metal layer is aluminum.

8. The heat insulating sheet according to claim 1, wherein a density of the nonwoven fabric is 2 $g/m^2$ or more and 150 $g/m^2$ or less.

9. A heat insulating material, comprising:
    a plurality of the heat insulating sheet according to claim 1 stacked upon each other.

10. The heat insulating material according to claim 9, wherein a ratio of an initial thickness ($T_0$)/a compressed thickness ($T_1$) is 2.5 or more when a thickness of 60 sheets of the heat insulating sheet stacked on a flat surface is measured.

* * * * *